United States Patent
Tosato et al.

(10) Patent No.: US 12,301,308 B2
(45) Date of Patent: May 13, 2025

(54) CRI EXTENSION FOR MULTI-TRP CSI ENHANCEMENT

(71) Applicant: Nokia Technologies Oy, Espoo (FI)

(72) Inventors: Filippo Tosato, Bures sur Yvette (FR); Salah Eddine Hajri, Antony (FR); Rana Ahmed Salem, Munich (DE)

(73) Assignee: Nokia Technologies Oy, Espoo (FI)

(*) Notice: Subject to any disclaimer, the term of this patent is extended or adjusted under 35 U.S.C. 154(b) by 179 days.

(21) Appl. No.: 17/223,639

(22) Filed: Apr. 6, 2021

(65) Prior Publication Data

US 2022/0321175 A1   Oct. 6, 2022

(51) Int. Cl.
| | |
|---|---|
| *H04B 7/024* | (2017.01) |
| *H04B 7/06* | (2006.01) |
| *H04L 1/00* | (2006.01) |
| *H04L 5/00* | (2006.01) |
| *H04W 24/10* | (2009.01) |

(52) U.S. Cl.
CPC ........... *H04B 7/024* (2013.01); *H04B 7/0626* (2013.01); *H04L 5/0035* (2013.01); *H04L 5/0051* (2013.01); *H04W 24/10* (2013.01)

(58) Field of Classification Search
None
See application file for complete search history.

(56) References Cited

U.S. PATENT DOCUMENTS

| | | | | |
|---|---|---|---|---|
| 2019/0349033 A1* | 11/2019 | Fakoorian | ............ | H04B 7/0417 |
| 2022/0094399 A1* | 3/2022 | Gao | ............ | H04B 7/0486 |
| 2022/0132526 A1* | 4/2022 | Nam | ............ | H04L 5/0051 |
| 2022/0140981 A1* | 5/2022 | Hindy | ............ | H04B 7/0639 370/329 |
| 2022/0302976 A1* | 9/2022 | Zhang | ............ | H04B 17/345 |
| 2022/0322333 A1* | 10/2022 | Khoshnevisan | ....... | H04B 7/063 |
| 2023/0028703 A1* | 1/2023 | Khoshnevisan | .... | H04W 52/325 |
| 2023/0208492 A1* | 6/2023 | Chen | ............ | H04B 7/0639 370/329 |

(Continued)

FOREIGN PATENT DOCUMENTS

WO   WO 2022/205068 A1 * 3/2021 ............ H04W 24/08

OTHER PUBLICATIONS

3GPP TS 38.212 V16.4.0, "3rd Generation Partnership Project; Technical Specification Group Radio Access Network; NR; Multiplexing and channel coding (Release 16)", Dec. 2020, 152 pages.

(Continued)

*Primary Examiner* — Jeffrey M Rutkowski
*Assistant Examiner* — Ning Li
(74) *Attorney, Agent, or Firm* — McCarter & English, LLP

(57) ABSTRACT

A UE measures RSs from at least two different groups of RSs transmitted from at least two different TRPs from corresponding different base stations. The UE calculates CSI for the at least two TRPs based on RSs configured in the at least two different groups. The UE sends report(s) corresponding to the calculated CSI, the report(s) comprising information for at least the two TRPs of a number of reported hypotheses for a single-TRP measurement and a corresponding association to a number of configured hypotheses for a single-TRP measurement. A TRP, under control of the base station, sends the RSs and receives the report(s).

15 Claims, 9 Drawing Sheets

(56) References Cited

U.S. PATENT DOCUMENTS

2023/0318676 A1\* 10/2023 Matsumura ........... H04W 24/10
370/329

OTHER PUBLICATIONS

3GPP TS 38214 V16,4.0, "3rd Generation Partnership Project; Technical Specification Group Radio Access Network; NR; Physical layer procedures for data (Release 16)", Dec. 2020, 169 pages.
3GPP TSG RAN WG1 Meeting #104-e, "RAN1 Chairman's Notes", Jan. 25-Feb. 5, 2021, 159 pages.
3GPP TSG RAN Meeting #89e, "Revised WID: Further enhancements on MIMO for NR", Samsung, RP-202024, Sep. 14-18, 2020, 5 pages.
Wu, Shanghin, et al., "Centralized and distributed schedulers for non-coherent joint transmission", arXiv:1809.03414v1 [eess.SP], Sep. 7, 2018, 6 pages.
"Summary of CSI enhancements for MTRP and FDD (Round 0)", Moderator (Huawei, HiSilicon), 3GPP TSG RAN WG1 Meeting #104-e, R1-2101884, Feb. 2021, 48 pages.
"CSI enhancements MTRP and FR1 FDD reciprocity", Qualcomm Incorporated, 3GPP TSG RAN WG1 #104-e, R1-2101452, Feb. 2021, 14 pages.
"CSI enhancements MTRP and FR1 FDD reciprocity", OPPO, 3GPP TSG RAN WG1 #104e, R1-2100124, Feb. 2021, 12 pages.
"Enhancement on CSI measurement and reporting", Nokia, Nokia Shanghai Bell, 3GPP TSG RAN WG1 Meeting #104-e, R1-2101011, Feb. 2021, 21 pages.

\* cited by examiner single-DCI multi-DCI

CRI extension – option 1

| CRI codepoint | Measurement hypothesis | |
|---|---|---|
| 0 | pair 0 | NCJT |
| 1 | pair 1 | |
| ⋮ | ⋮ | |
| $N-1$ | pair $N-1$ | |
| $N$ | CMR 0 | Single-TRP Group 1 |
| ⋮ | ⋮ | |
| $N + \lceil K_s^C/2 \rceil - 1$ | CMR $\lceil K_s^C/2 \rceil - 1$ | |
| $N + \lceil K_s^C/2 \rceil$ | CMR $K_1 + 1$ | Single-TRP Group 2 |
| ⋮ | ⋮ | |
| $N + K_s^C - 1$ | CMR $K_1 + \lfloor K_s^C/2 \rfloor$ | |

FIG. 5A

CRI extension−option 2

| CRI codepoint | Measurement hypothesis | |
|---|---|---|
| 0 | pair 0 | NCJT |
| 1 | pair 1 | |
| ⋮ | ⋮ | |
| $N-1$ | pair $N-1$ | |
| $N$ | CMR 0 | Single-TRP |
| $N+1$ | CMR $K_1$ | |
| $N+2$ | CMR 1 | |
| $N+3$ | CMR $K_1 + 1$ | |
| ⋮ | ⋮ | |
| $N + K_s^C - 1$ | CMR $(K_s^C - 1 \bmod 2)\frac{K_s}{2} + \left\lfloor \frac{K_s^C - 1}{2} \right\rfloor$ | |

FIG. 5B single-DCI multi-DCI

CRI EXTENSION FOR MULTI-TRP CSI ENHANCEMENT

TECHNICAL FIELD

Exemplary embodiments herein relate generally to wireless communication systems, and, more specifically, relates to transmissions using multiple transmit/receive points.

BACKGROUND

The term TRP stands for transmit/receive point and is a part of a base station such as a gNB that transmits radio signals to and receives radio signals from a UE (user equipment). Multi-TRP transmission/reception is the NR (new radio) version of CoMP (coordinated multi-point transmission/reception) in LTE (long term evolution). The cooperation between the TRPs of two gNBs (base stations for 5G, fifth generation) is performed through a backhaul connection.

CoMP includes downlink schemes such as JT (joint transmission), which can be further divided into coherent JT (CJT) and non-coherent JT (NCJT). CJT performs joint beamforming from all coordinated TRPs, which can be regarded as a distributed multiple-input multiple-output (MIMO) system. NCJT allows coordinated TRPs to transmit independent layers to the target UE.

In further detail, in multi-TRP operation, a serving cell can schedule a UE from two TRPs, providing better PDSCH (physical downlink shared channel) coverage, reliability and/or data rates. There are two different operation modes for multi-TRP: single-DCI (downlink control information), for ideal backhaul connection with low latency; and multi-DCI, for nonideal backhaul with higher latency. For both modes, control of uplink and downlink operation is performed by both physical layer and MAC (medium access control). In single-DCI mode, the UE is scheduled by the same DCI for both TRPs; and in multi-DCI mode, the UE is scheduled by independent DCIs from each TRP.

Since the UE is communicating with two TRPs (as in this example), there can be issues with measuring and reporting CSI (channel state information). For instance, both TRPs can transmit CMRs (channel measurement resources), but the UE has to know when these will be transmitted, by which TRP, and in what resources these will be transmitted. The UE also has to be able to determine to which TRP to send the reports.

BRIEF SUMMARY

This section is intended to include examples and is not intended to be limiting.

In an exemplary embodiment, a method is disclosed that includes measuring, by a user equipment, reference signals from at least two different groups of reference signals transmitted from at least two different transmission-reception points from corresponding different base stations. The method includes calculating, by the user equipment, channel state information for the at least two transmission-reception points based on reference signals configured in the at least two different groups. The method further includes sending, by the user equipment, one or more reports corresponding to the calculated channel state information, the one or more reports comprising information for at least the two transmission-reception points of a number of reported hypotheses for a single-transmission-reception point measurement and a corresponding association to a number of configured hypotheses for a single-transmission-reception point measurement.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to: measure, by a user equipment, reference signals from at least two different groups of reference signals transmitted from at least two different transmission-reception points from corresponding different base stations; calculate, by the user equipment, channel state information for the at least two transmission-reception points based on reference signals configured in the at least two different groups; and send, by the user equipment, one or more reports corresponding to the calculated channel state information, the one or more reports comprising information for at least the two transmission-reception points of a number of reported hypotheses for a single-transmission-reception point measurement and a corresponding association to a number of configured hypotheses for a single-transmission-reception point measurement.

An exemplary computer program product includes a computer-readable storage medium bearing computer program code embodied therein for use with a computer. The computer program code includes: code for measuring, by a user equipment, reference signals from at least two different groups of reference signals transmitted from at least two different transmission-reception points from corresponding different base stations; code for calculating, by the user equipment, channel state information for the at least two transmission-reception points based on reference signals configured in the at least two different groups; and code for sending, by the user equipment, one or more reports corresponding to the calculated channel state information, the one or more reports comprising information for at least the two transmission-reception points of a number of reported hypotheses for a single-transmission-reception point measurement and a corresponding association to a number of configured hypotheses for a single-transmission-reception point measurement.

In another exemplary embodiment, an apparatus comprises means for performing: measuring, by a user equipment, reference signals from at least two different groups of reference signals transmitted from at least two different transmission-reception points from corresponding different base stations; calculating, by the user equipment, channel state information for the at least two transmission-reception points based on reference signals configured in the at least two different groups; and sending, by the user equipment, one or more reports corresponding to the calculated channel state information, the one or more reports comprising information for at least the two transmission-reception points of a number of reported hypotheses for a single-transmission-reception point measurement and a corresponding association to a number of configured hypotheses for a single-transmission-reception point measurement.

In an exemplary embodiment, a method is disclosed that includes sending reference signals from a first transmission-reception point of a first base station toward a user equipment. The user equipment is also in communication at least with a second transmission-reception point of a second base station. Reference signals from at least two different groups of reference signals are transmitted from at least the first and second transmission-reception points. The method includes receiving, by the first base station and from the user equipment, one or more reports corresponding to channel state information calculated by the user equipment for reference signals configured in the at least two different groups, the one or more reports comprising information for at least the two transmission-reception points of a number of reported hypotheses for a single-transmission-reception point measurement and a corresponding association to a number of configured hypotheses for a single-transmission-reception point measurement.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to: send reference signals from a first transmission-reception point of a first base station toward a user equipment, where the user equipment is also in communication at least with a second transmission-reception point of a second base station, wherein reference signals from at least two different groups of reference signals are transmitted from at least the first and second transmission-reception points; and receive, by the first base station and from the user equipment, one or more reports corresponding to channel state information calculated by the user equipment for reference signals configured in the at least two different groups, the one or more reports comprising information for at least the two transmission-reception points of a number of reported hypotheses for a single-transmission-reception point measurement and a corresponding association to a number of configured hypotheses for a single-transmission-reception point measurement.

An exemplary computer program product includes a computer-readable storage medium bearing computer program code embodied therein for use with a computer. The computer program code includes: code for sending reference signals from a first transmission-reception point of a first base station toward a user equipment, where the user equipment is also in communication at least with a second transmission-reception point of a second base station, wherein reference signals from at least two different groups of reference signals are transmitted from at least the first and second transmission-reception points; and code for receiving, by the first base station and from the user equipment, one or more reports corresponding to channel state information calculated by the user equipment for reference signals configured in the at least two different groups, the one or more reports comprising information for at least the two transmission-reception points of a number of reported hypotheses for a single-transmission-reception point measurement and a corresponding association to a number of configured hypotheses for a single-transmission-reception point measurement.

In another exemplary embodiment, an apparatus comprises means for performing sending reference signals from a first transmission-reception point of a first base station toward a user equipment, where the user equipment is also in communication at least with a second transmission-reception point of a second base station, wherein reference signals from at least two different groups of reference signals are transmitted from at least the first and second transmission-reception points; and receiving, by the first base station and from the user equipment, one or more reports corresponding to channel state information calculated by the user equipment for reference signals configured in the at least two different groups, the one or more reports comprising information for at least the two transmission-reception points of a number of reported hypotheses for a single-transmission-reception point measurement and a corresponding association to a number of configured hypotheses for a single-transmission-reception point measurement.

BRIEF DESCRIPTION OF THE DRAWINGS

In the attached Drawing Figures:

FIGS. 5A and 5B illustrate exemplary CRI extensions: two alternative options (option 1 in FIG. 5A and option 2 in FIG. 5B) providing mapping of the CRI codepoints to NCJT pairs and single-TRP CMR resources, in accordance with an exemplary embodiment;

DETAILED DESCRIPTION OF THE DRAWINGS

Figure 1:
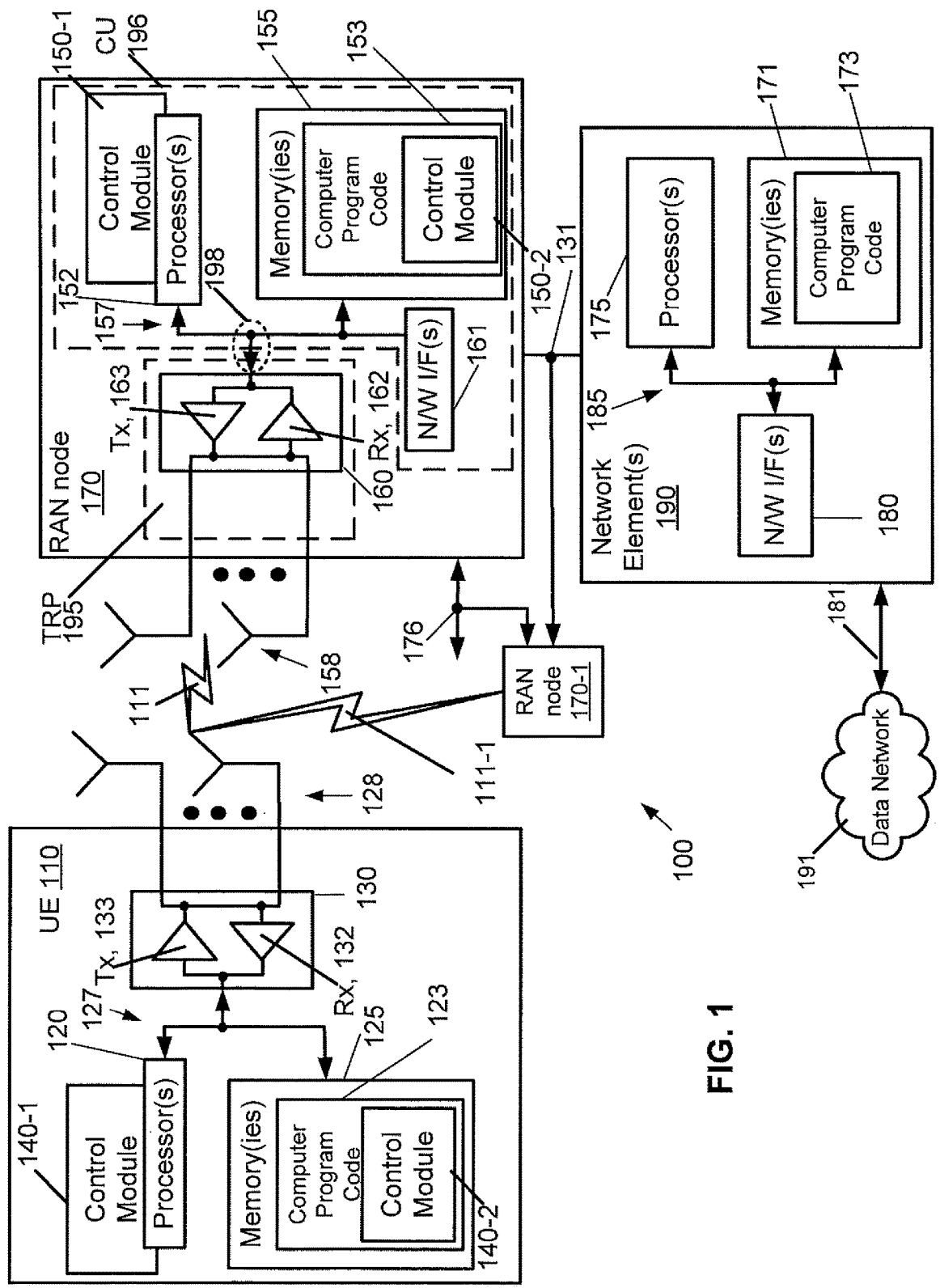
FIG. 1 is a block diagram of one possible and non-limiting exemplary system in which the exemplary embodiments may be practiced.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for CRI extension for multi-TRP CSI enhancement. Additional description of these techniques is presented after a system into which the exemplary embodiments may be used is described.

Turning to FIG. 1, this figure shows a block diagram of one possible and non-limiting exemplary system in which the exemplary embodiments may be practiced. A user equipment (UE) 110, radio access network (RAN) nodes 170 and 170-1, and network element(s) 190 are illustrated. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111 and with the RAN node 170-1 via wireless link 111-1.

The RAN nodes 170 and 170-1 are base stations that provide access by wireless devices such as the UE 110 to the wireless network 100. The RAN nodes 170 and 170-1 are considered to be similar, and therefore the exemplary circuitry within only the RAN node 170 is illustrated and described. The RAN node 170 may be, for instance, a base station for 5G, also called New Radio (NR). The RAN node 170 includes a TRP 195, described in further detail below. In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s)(DUs) (gNB-DUs), which a TRP 195 may use. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the TRP (e.g., as a gNB-DU) 195. The gNB-DU is a logical node hosting RLC, MAC and PHY layers of the gNB or en-gNB, and its operation is partly controlled by gNB-CU. One gNB-CU supports one or multiple cells. One cell is supported by one gNB-DU. The gNB-DU terminates the F1 interface 198 connected with the gNB-CU. Note that a TRP 108 implemented by or comprises a DU is considered to include the transceiver 160, e.g., as part of an RU, but some examples of this may have the transceiver 160 as part of a separate RU, e.g., under control of and connected to the TRP 195, e.g., via a DU. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the TRP (e.g., as a DU) 195 may also contain its own memory/memories and processor(s), and/or other hardware, but these are not shown.

The RAN node 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the control module 150 may be distributed, such as being distributed between the TRP 195 (e.g., as a distributed unit, DU) and the CU 196, or be implemented solely in the TRP 195.

The one or more network interfaces 161 communicate over a network such as via the links 176 and 131. Two or more RAN nodes 170 communicate using, e.g., link 176, which is commonly referred to as a backhaul link. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. In conjunction with this, the TRP 195 may be implemented in multiple forms. For instance, the TRP may be implemented as a remote radio head (RRH) for LTE or a distributed unit (DU) for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the TRP 195. Reference 198 also indicates those suitable network link(s).

The wireless network 100 may include a network element or elements 190 that may include core network functionality, and which provides connectivity via a link or links 181 with a data network 191, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NO interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, vehicles with a modem device for wireless V2X (vehicle-to-everything) communication, image capture devices such as digital cameras having wireless communication capabilities, gaming devices having wireless communication capabilities, music storage and playback appliances having wireless communication capabilities, Internet appliances (including Internet of Things, IoT, devices) permitting wireless Internet access and possibly browsing, IoT devices with sensors and/or actuators for automation applications with wireless communication tablets with wireless communication capabilities, as well as portable units or terminals that incorporate combinations of such functions.

As previously described in part, in multi-TRP operation, a serving cell can schedule a UE 110 from two TRPs 195, providing better PDSCH coverage, reliability and/or data rates. There are two different operation modes for multi-TRP: single-DCI (for ideal backhaul connection with low latency) and multi-DCI (for nonideal backhaul with higher latency). For both modes, control of uplink and downlink operation is done by both physical layer and MAC. In single-DCI mode, UE is scheduled by the same DCI for both TRPs and in multi-DCI mode, UE is scheduled by independent DCIs from each TRP.

Figure 2A:
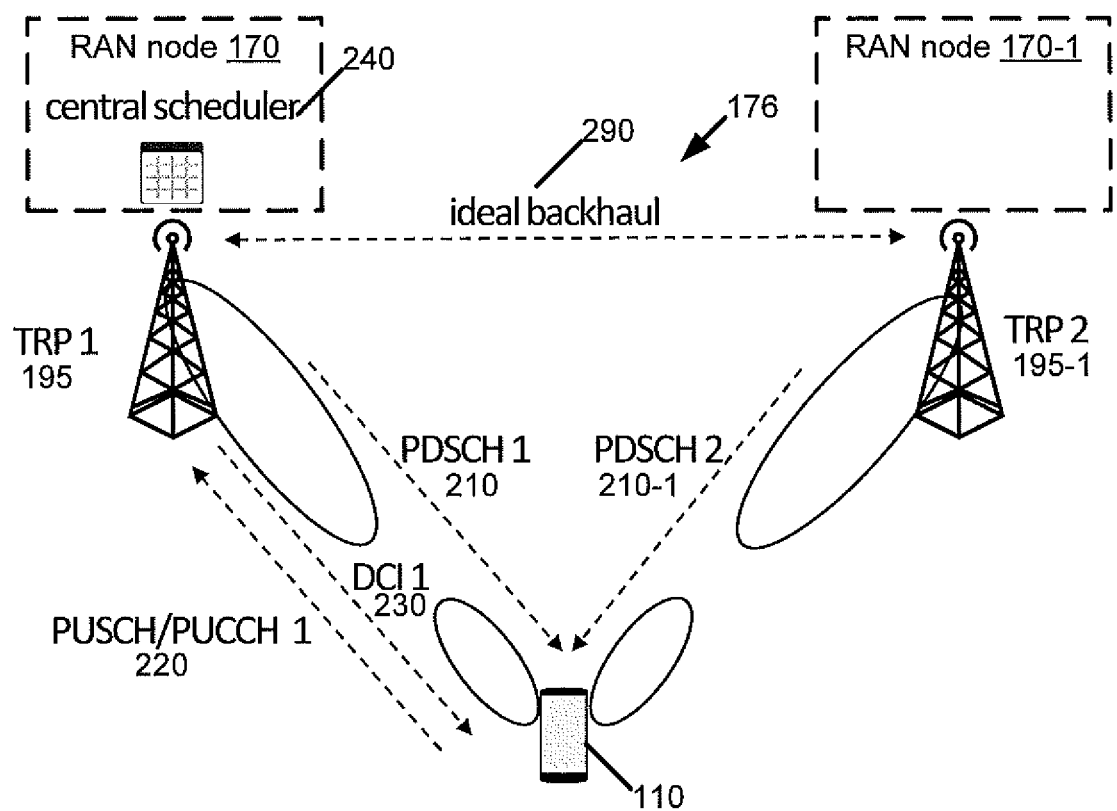
FIG. 2A illustrates an example of two TRPs communicating with a single UE for a single-DCI scenario.

FIG. 2A illustrates an example of two TRPs communicating with a single UE for a single-DCI scenario. There is a central scheduler 240 implemented in the RAN node 170, and the RAN node 170 communicates via the TRP 1 195 with the UE 110 using PDSCH 1 210 and DCI 1 230 in downlink and PUSCH/PUCCH 1 220 in uplink. The RAN node 170-1 communicates via the TRP 2 195-1 via the PDSCH 2 210-1 in downlink. The central scheduler 240 performs the scheduling functions and communicates with the RAN node 170-1 via the link 176, using the ideal backhaul 290. The term "ideal backhaul" refers to a low-latency and high capacity backhaul link such that both TRPs can be scheduled by a single control channel (single-DCI).

Figure 2B:
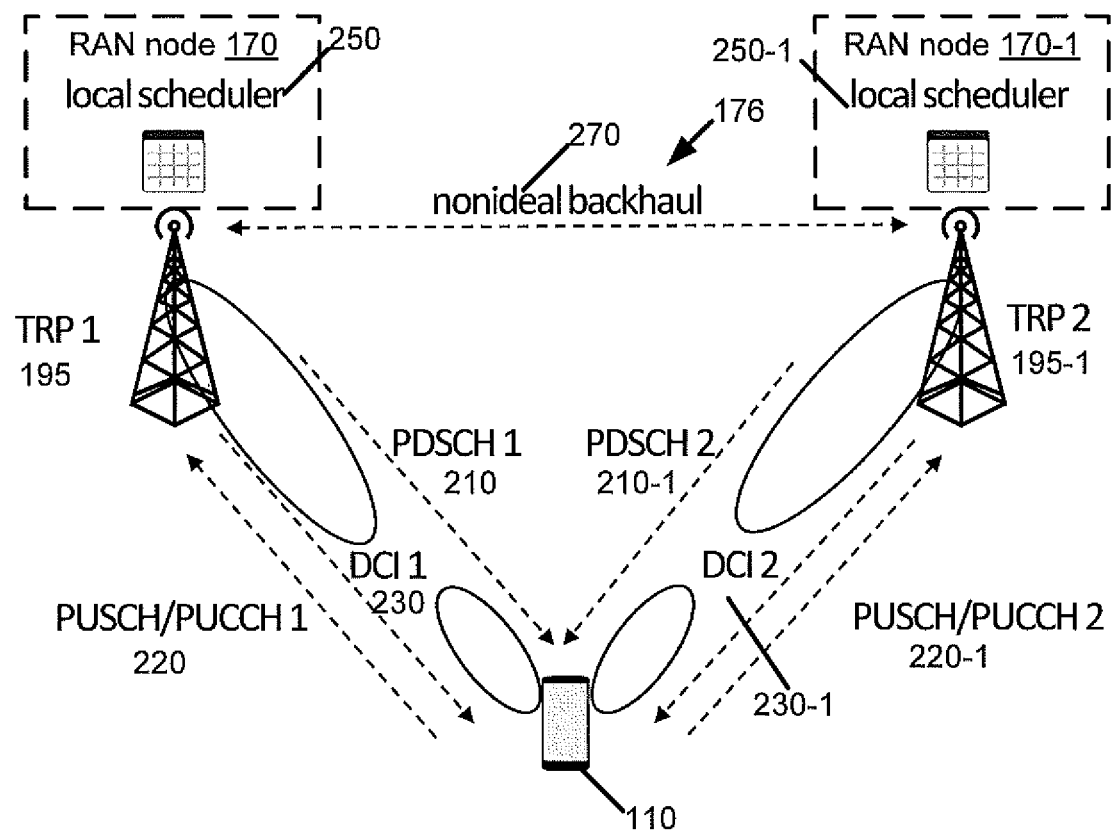
FIG. 2B illustrates an example of two TRPs communicating with a single UE for a multi-DCI scenario.

FIG. 2B illustrates an example of two TRPs communicating with a single UE for a multi-DCI scenario. There is a local scheduler 250 implemented in the RAN node 170, and the RAN node 170 communicates via the TRP 1 195 with the UE 110 using PDSCH 1 210 and DCI 1 230 in downlink and PUSCH/PUCCH 1 220 in uplink. There is a local scheduler 250-1 implemented in the RAN node 170-1, and the RAN node 170-1 communicates via the TRP 2 195-1 with the UE 110 using PDSCH 2 210-1 and DCI 2 230-1 in downlink and PUSCH/PUCCH 2 220-1 in uplink. The two local schedulers 250, 250-1 together perform the scheduling functions and communicate via the link 176, using the nonideal backhaul 270. The term "nonideal" backhaul refers to a backhaul link with larger latency and/or lower capacity, such that each TRP is scheduled separately by its own control channel (multi-DCI) and coordination is possible but with some delay.

The schedulers 240, 250, and 250-1 may be implemented as part of the control module 150 in each of the RAN nodes 170 and 170-1. Other options are also possible.

Having thus introduced one suitable but non-limiting technical context for the practice of the exemplary embodiments, the exemplary embodiments will now be described with greater specificity.

In the NR framework for CSI and beam measurement and reporting, a UE can be configured to measure the channel on multiple CSI-RS resources for channel measurement (CMR, where CMR=channel measurement resource). In Rel 15/16, for CSI reporting (e.g., using 'cri-RI-PMICQI', 'cri-RI-i1', 'cri-RI-i1-CQI', 'cri-RI-CQI' or 'cri-RI-LI-PMI-CQI'), with Type-I codebook-based CSI calculations, up to 8 CMRs can be configured in a resource set, whereas for beam reporting (e.g., using 'cri-RSRP' or 'cri-SINR'), up to 16 CMRs can be configured per resource set (see section 5.2.1.4.1 of 3GPP TS 38.214, "Physical layer procedures for data (Release 16)").

In the following description, reference is made to CSI measurement and reporting. However, the same concepts are applicable to beam reporting as well.

When multiple CMRs are configured in a resource set, the CSI-RS resource indicator (CRI) is used by a UE to indicate to the gNB which resource the reported CSI was measured on. In Rel 15/16, the number, $K_S$, of CMRs determines the bit width of the CRI, defined as $\lceil \log_2 K_S \rceil$ (see Table 6.3.1.1.2-3 in 3GPP TS 38.212, "Multiplexing and channel coding (Release 16)"), and the order in which the CMRs are listed in the resource set determines the natural mapping of CRI codepoints to the CMRs. Besides, $K_S$ also determines the number of CPUs, i.e., CSI calculations, occupied by a CSI report: in practice, one CPU is occupied during the buffering of each CSI-RS resource and the corresponding CSI calculation, until the report is transmitted in the scheduled UL control or data resource.

In Rel 17, enhanced support for multi-TRP CSI measurement and reporting is currently being introduced. See 3GPP TS 38.214. In RAN1 #104-e (Sec. 8.1.4 of "3GPP RAN1 #104-e Chairman's Notes", January-February 2021), it was agreed that a CSI reporting setting (CSI-ReportConfig) for multi-TRP CSI reporting can be configured with $K_S \geq 2$ CMRs in the resource set, arranged in two CMR groups, with $K_1$ and $K_2$ resources each, such that $K_S = K_1 + K_2$. N CMR pairs, one from each group, are higher-layer configured for NCJT (noncoherent joint transmission) measurement, such that a UE can be configured to measure certain pairs of resources under an NCJT hypothesis and individual resources under single-TRP transmission hypothesis. It is noted that a reference to layers here is to protocol stack layers for LTE/5G or other communications, where an application layer is typically the highest layer and the physical layer is the lowest layer. Note also that there is no need for TRP association to each CMR group. In fact, in case of TRP clusters with more than 2 TRPs, the CMRs in each group may be transmitted by more than one TRP. The relative agreement is reported below:

For CSI measurement associated to a reporting setting CSI-ReportConfig for NCJT, the UE can be configured with $K_S \geq 2$ NZP CSI-RS resources in a CSI-RS resource set for CMR and $N \geq 1$ NZP CSI-RS resource pairs whereas each pair is used for a NCJT measurement hypothesis:

1) Configure the UE with two CMR groups with $K_S = K_1 + K_2$ CMRs. CMR pairs are determined from two CMR groups by following method(s).
   a) $K_1$ and $K_2$ are the number of CMRs in two groups respectively. FFS $K_1 = K_2$ or different $K_1/K_2$.
   b) Note that CMRs in each CMR group can be used for both NCJT and Single-TRP measurement hypotheses
   c) N CMR pairs are higher-layer configured by selecting from all possible pairs
      i) signaling mechanism can be discussed further, e.g., using a bitmap;
      ii) FFS: Whether MAC-CE or RRC+MAC CE indication is needed;
      iii) FFS: how to support NCJT measurement hypotheses in FR2
2) Support N=1 and $K_S$=2, FFS other maximal values of N>1 and $K_S$>2.
3) Note: for CPU/resource/port occupation, NCJT hypothesis is considered separately from a single TRP hypothesis.

In RAN1 #104-e, it was also agreed that a single CSI reporting setting can configure a UE to report more than one CSIs, according to the following four possible configuration options:
1) One CSI:
   a) Best NOT. The UE reports the best of NCJT hypotheses.
   b) Best {NCJT, group 1, group 2}. The UE reports the best of all configured NCJT and single-TRP hypotheses
2) Two CSIs:
   a) Best NCJT+best {group1, group 2}. The UE reports the best of NCJT hypotheses and the best of single-TRP hypotheses.
3) Three CSIs:
   a) Best NCJT+best group 1+best group 2. The UE reports the best of NCJT hypotheses, the best of single-TRP hypotheses from group 1 and the best of single-TRP hypotheses from group 2.

Figure 3:
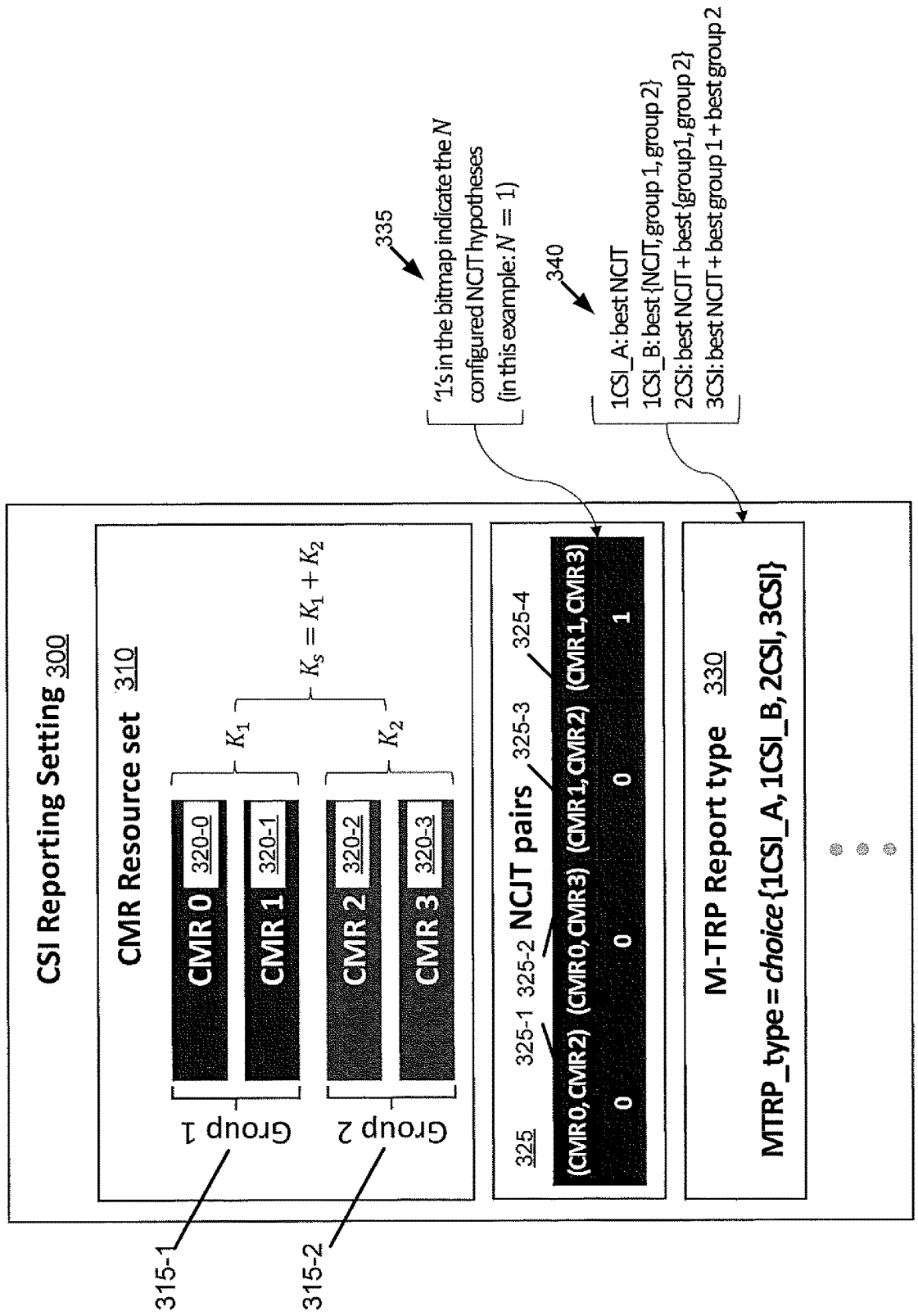
FIG. 3 illustrates an exemplary CSI reporting setting configuration, in principle, for multi-TRP CSI measurement and reporting.

The relative agreement is reported below:
For a CSI report associated with a Multi-TRP/panel NCJT measurement hypothesis configured by single CSI reporting setting, support following two options:
1) Option 1: the UE can be configured to report X CSIs associated with single-TRP measurement hypotheses and one CSI associated with NCJT measurement hypothesis:
   a) X=0, 1, 2;
      i) If X=2, two CSIs are associated with two different single-TRP measurement hypotheses with CMRs from different CMR groups.
      ii) Support of X=1, 2 is UE optional for the UE supporting option 1.
   b) FFS omission of CSI associated with NCJT measurement hypothesis
2) Option 2: the UE can be configured to report one CSI associated with the best one among NCJT and single-TRP measurement hypotheses.
   a) FFS how to report recommended measurement hypothesis associated with that CSI report FIG. 3 illustrates part of a possible structure for a multi-TRP CSI reporting setting according to the agreements so far. The CSI reporting setting 300 comprises a CMR resource set 310, NCJT pairs 325, and an M-TRP report type 330. The CMR resource set 310 includes group 1 315-1 and group 2 315-2. Group 1 315-1 includes CMR 0 320-0 and CMR 1 320-1 and corresponds to $K_1$ resources. Group 2 315-2 includes CMR 2 320-2 and CMR 3 320-3 and corresponds to $K_2$ resources. The set of resources $K_S = K_1 + K_2$. There are four NCJT pairs 325: pair 325-1 of (CMR 0, CMR 2); pair 325-2 of (CMR 0, CMR 3); pair 325-3 of (CMR 1, CMR 2); and pair 325-4 of (CMR 1, CMR 3). As indicated by reference 335, the '1s' (ones) in the bitmap indicate the N configured NCJT hypotheses (in this example: N=1). For the M-TRP report type 330, the MTRP_type=choice {1CSI_A, 1CSI_B, 2CSI, 3CSI}. As indicated by reference 340, the possible choices include the following in this example:
   1CSI_A: bestNCJT;
   1CSI_B: best {NCJT, group 1, group 2};
   2CSI: best NCJT+best {group1, group 2}; and/or
   3CSI: best NCJT+best group 1+best group 2.

The choice {●} nomenclature is a common expression from ASN.1 (abstract syntax notation one) used in RAN2 specification 3GPP TS 38.331. This expression means the network selects one option in the set.

In more detail about these choices, a UE measures one or more CSI-RS resources (CMR resources) in a resource set. The UE can measure individual CMRs, under the assumption that a single TRP is transmitting. This is referred to as a single-TRP measurement hypothesis. The UE can also measure CMR pairs, under the assumption that two TRPs are transmitting in the same time and frequency resource. This is referred to as an NCJT measurement hypothesis (NOT stands for noncoherent joint transmission because, although the TRPs are transmitting jointly, the relative phase difference between their signal is not controlled).

So, the expression "best {NCJT, group 1, group 2}" (as one example) means that a UE reports the CSI corresponding to the measurement hypothesis proving the best CQI, between all the configured NCJT and single-TRP hypotheses.

The exact higher layer mechanisms (e.g., RRC and/or MAC-CE, bitmap for NCJT pairs, and the like) have not been decided yet. In general, CSI reports are configured in RRC with a CSI Reporting Setting (CSI-ReportConfig) and they can be of three types with respect to their time behavior: periodic CSI (p-CSI) on PUCCH, semi-persistent (sp-CSI) on PUCCH and/or PUSCH; and aperiodic (a-CSI) on PUSCH. For sp-CSI and a-CSI, MAC-CE commands are used to activate/deactivate (for sp-CSI) or trigger (for a-CSI) a report and these commands can contain fields that can change dynamically the RRC configuration parameters. Conversely, for a p-CSI, RRC reconfiguration (which is more cumbersome) is needed to change the parameters of the reporting setting.

Although exact higher layer mechanisms have not been decided yet, the following information elements should be included in the configuration: two groups of CMR resources comprising $K_S \geq 2$ resources, indication of $N \geq 1$ CMR pairs corresponding to the configured NCJT hypotheses (in the figure, a bitmap is used with the bit values set to '1' for the configured pairs. In the example illustrated, N=1), and an indication of what type of multi-TRP report is configured, with the four possible configurations described above.

There are two main issues with this reporting setting 300 that need to be addressed: 1) how a UE indicates to the network the NOT and single-TRP hypotheses corresponding to the reported CSIs; 2) how many CSI calculations, i.e., CPUs are occupied by a multi-TRP CSI report.

Regarding the UE's reporting of NCJT/single-TRP CSI hypotheses, the reuse of CRI indication is one possible choice. However, the current CRI definition assigns CRI codepoints only to the configured CMR resources, hence a UE would need to report two CRIs to identify an NCJT hypothesis. Besides, in some use cases, not all the CMR resources are intended for single-TRP measurement, hence not all the resources in the set need to be associated to a CRI codepoint. For example, consider the following three use cases.

1) The gNB 170 (i.e., one possible type of RAN node 170) configures one CMR resource per TRP 195 for a single-TRP transmission hypothesis and a different one for an NCJT hypothesis. For example, the CMR resources to be measured for NCJT are beamformed such that interference between the two TRP is minimized for cell edge UEs (UEs at the edge of a cell created by the TRP), whereas the CMR resources intended for single-TRP are beamformed to maximize the single-TRP beamforming gain.

2) In FR2, a UE may use different receive spatial filters to measure NCJT and single-TRP hypotheses. For example, when buffering the CSI-RS measurement on a CMR for an NCJT hypothesis, the receive spatial filters may be optimized for single-panel reception, with one different panel measuring each CMR resource in the NCJT pair. Conversely, for a single-TRP measurement hypothesis, the spatial filters may be optimized for two-panel reception, as both panels can be tuned towards a single TRP. Therefore, a single-TRP measurement may be impacted if a single CMR resource is configured for both single-TRP and NCJT measurements, as only one spatial filter can be used for each panel. In this case, it would be beneficial to configure different CMR resources for single-TRP and NCJT measurement hypotheses.

3) The gNB 170 may dynamically update the NCJT pairs by MAC-CE, in case of aperiodic and semi-persistent reporting, based on some prior information of the channel propagating conditions or some other CSI scheduling constraints. For example, the gNB may decide to remove an NCJT hypothesis that is unlikely to be selected and increase the number of single-TRP measurements. In another example, if another periodic CSI report is configured, a gNB may want to schedule an aperiodic multi-TRP report with reduced number of CSI calculations to avoid CPU overbooking. This can be performed by reducing the number of single-TRP measurements or removing some NCJT pairs.

Regarding the number of CPUs, $O_{CPU}$, occupied by an M-TRP CSI report with $K_S$ CMR resources and N NCJT pairs, the current definition for single-TRP CSI reporting, $O_{CPU}=K_S$, does not count the NCJT measurements, which occupy two CPUs each. On the other hand, if a new definition is adopted to include the NCJT hypotheses, $O_{CPU}=2N+K_S$, there is a problem of overbooking of CPUs if not all the CMR resources in the set are intended for single-TRP measurement according to the use cases described above. The problem of overbooking is in the sense that a gNB may configure CSI reports that require, for a certain number of symbols, more CPUs than available at the UE. This can happen for a number of reasons, although the network aims to avoid this situation because in this case a UE would not update the reports following a certain priority order. If the CPU occupancy associated with the report is larger than the actual number of CSI measurements, a UE may not update the report even when enough CPUs are available for its calculation.

The exemplary embodiments address at least the problems described, are illustrated in part in FIGS. 4, 5A, and 5B, and can be summarized as follows. In an exemplary embodiment, two higher-layer parameters are introduced indicating a number of configured hypotheses for single-TRP measurement ($K_S^C$) and the number of reported hypotheses for single-TRP measurement ($K_S^R$). The value range for parameter $K_S^C$ is {0, 1, . . . , Ks}, whereas the value range for parameter $K_S^R$ is {0,1,2} in this exemplary embodiment. The two parameters together determine the four possible M-TRP report types (see reference 330 of FIG. 3) with 1, 2, or 3 CSIs. The number of configured S-TRP hypotheses is enough to extend the CRI definition in a flexible and unambiguous manner, for all possible reporting configurations and to define the number of CPUs occupied by the CSI reporting setting.

Note that the exemplary embodiment for the CRI extension introduces a special mapping of NCJT and S-TRP measurement hypotheses to CRI codepoints, such that the N NCJT hypotheses indicated by the bitmap are mapped to the first N CRI codepoints, whereas the $K_S^C$ configured S-TRP measurements hypotheses, identified by a CMR index, are taken alternately from the two CMR groups and mapped to the last $K_S^C$ codepoints of the CRI.

Now that a summary has been provided, additional details are provided. Overviews of FIGS. 4, 5A, and 5B are described. FIG. 4 illustrates an exemplary proposed CSI reporting setting configuration for multi-TRP CSI measurement and reporting with a flexible mechanism to extend the CRI definition and define the CPU occupancy. This figure illustrates the CSI reporting setting 400 that includes part of the CSI reporting setting 300 of FIG. 3, along with additional information. The CMR resource set 310 and the NCJT pairs from FIG. 3 are the same, but the M-TRP reported type 330 is missing. Instead, in this case, there are an S-TRP configured hypothesis 410 and an S-TRP reported hypothesis 420.

The S-TRP configured hypothesis 410 is $K_S^C$=choice $\{0, 1, \ldots, K_S\}$, and corresponds to (see reference 430) a CRI bit width of $\lceil \log_2(N+K_S^C) \rceil$, where $\lceil \cdot \rceil$ indicates a ceiling operator, and to (see reference 440) a CPU occupancy of $O_{CPU}=2N+K_S^C$. The S-TRP reported hypothesis 420 is $K_S^R$=choice $\{0,1,2\}$. The CRI information is used by the gNB. Each CSI-RS may be transmitted with different analog/digital beamforming so the gNB needs to know to which CMR resource(s) the CSI refers, in order to be able to transmit PDSCH and DMRS correctly. Both the UE and gNB use the CPU occupancy information, because both need to keep count of how many CPUs are occupied by CSI calculations at any symbol. If the total number of CPUs occupied exceeds the UE capability, a UE needs to take action by not updating certain CSI reports based on specified priority rules. The gNB also needs to keep the same count, first to avoid so called "CPU overbooking" when scheduling multiple CSI reports and, second to know which reports are not updated in case overbooking does occur.

Both the S-TRP configured hypothesis 410 and the S-TRP reported hypothesis 420 correspond to (see reference 450) the following:

$K_S^R=0$, $K_S^C=0$: best NCJT;
$K_S^R=0$, $K_S^C>0$: best (NCJT, group 1, group 2);
$K_S^R=1$: best NCJT+best {group1, group 2}; and/or
$K_S^R=2$: best NCJT+best group 1+best group 2.

FIGS. 5A and 5B illustrate exemplary CRI extension: two alternative options (option 1 in FIG. 5A and option 2 in FIG. 5B) providing mapping of the CRI codepoints to NCJT pairs and single-TRP CMR resources.

As previously stated, exemplary embodiments introduce two higher-layer parameters, $K_S^C$ and $K_S^R$, configuring the number of single-TRP measurement hypotheses and the number of reported single-TRP CSIs, respectively. The two parameters may be RRC configured, at least for periodic CSI (p-CSI) reporting and may be dynamically indicated by MAC-CE for semi-periodic (sp-CSI) and aperiodic (a-CSI) reporting. MAC-CE indication, in an exemplary embodiment, of these parameters allows the network 100 to flexibly configure the number of CSIs in the report and the number of single-TRP hypotheses, for example based on prior knowledge of the channel conditions.

The ability to adjust the number of configured single-TRP measurement hypotheses allows the network to configure a number of CMR resources in a resource set, $K_S \geq K_S^C$, larger than the number of configured single-TRP hypotheses. This is particularly useful in use cases where the CMR resources to be measured for NCJT are different than those for single-TRP, or the number of configured NCJT pairs changes dynamically by a MAC-CE indication of an NCJT bitmap, and the like.

The $K_S^C$ CMR resources configured for single-TRP measurements may be selected from both CMR groups: $\lceil K_S^C/2 \rceil$ from CMR group 1 and $\lfloor K_S^C/2 \rfloor$ from CMR group 2.

Both CRI extension and CPU occupancy are uniquely defined by parameter $K_S^C$. Regarding the CRI extension, the CRI bit width (see ref 430 of FIG. 4) associated to a multi-TRP CSI reporting setting is in an example $$\text{CRI bitwidth}=\lceil \log_2(N+K_S^C) \rceil, \tag{1}$$

Figure 4:
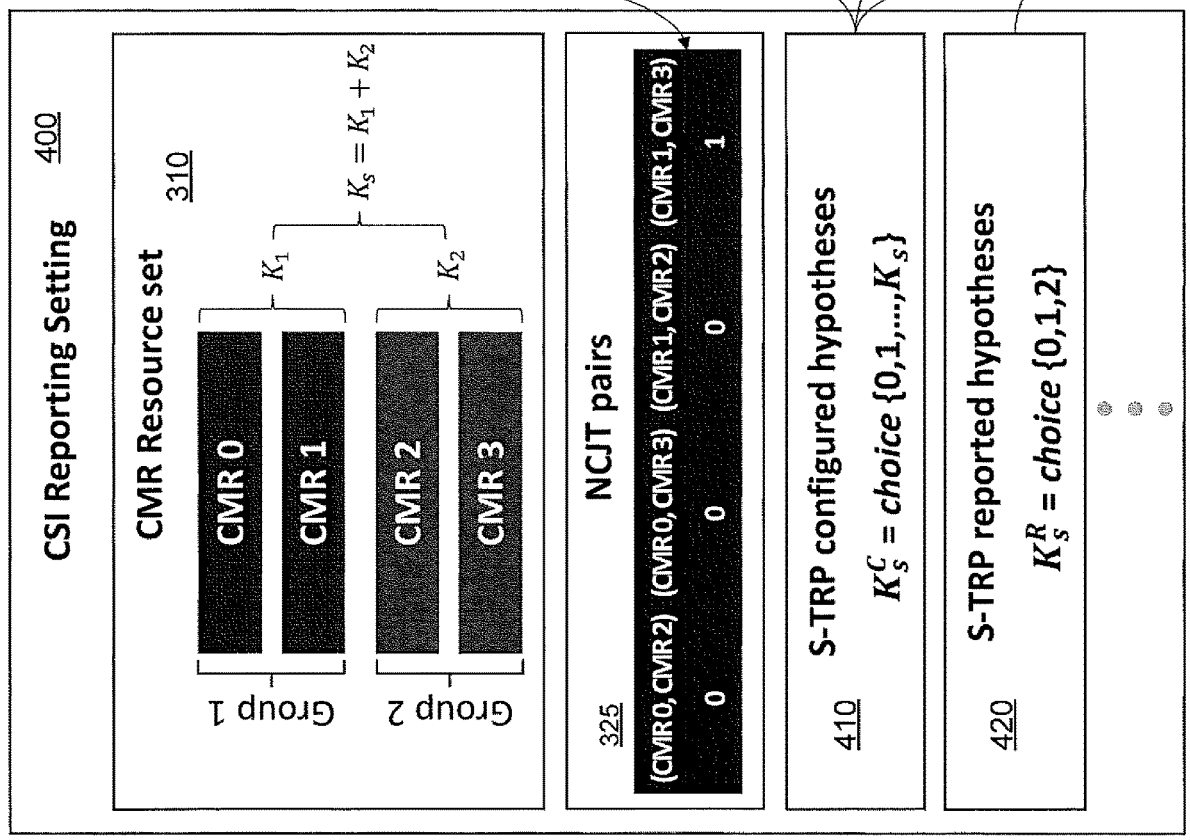
FIG. 4 illustrates an exemplary proposed CSI reporting setting configuration for multi-TRP CSI measurement and reporting with a flexible mechanism to extend the CRI definition and define the CPU occupancy, in accordance with an exemplary embodiment.

The first N codepoints are reserved to the NCJT pairs identified by the higher-layer indication, for example a bitmap as shown in FIGS. 3 and 4, with the mapping order following the increasing pair index as shown in the CRI tables of FIGS. 5A and 5B. The reason for reserving the first N codepoints to the NCJT hypotheses is that NCJT measurement are always present in a multi-TRP CSI reporting setting, whereas single-TRP measurements may not be configured, hence it makes sense to associate the same codepoints to the NCJT pairs regardless of how many CSIs are reported. The last $K_S^C$ codepoints may be reserved to single-TRP measurement hypotheses. Note that the value set for $K_S^C$ is $\{0, 1, \ldots, K_S\}$, which includes the value 0. In fact, if $K_S^C=0$, a UE is configured to report only a single CSI with the best NCJT measurement, hence the CRI does not need to associate any codepoint to single-TRP CMR resources.

The mapping of CMR resources configured for single-TRP measurements to CRI codepoints can follow one of the two alternatives illustrated by the tables in FIGS. 5A and 5B. In the first mapping (FIG. 5A), consecutive codepoints are reserved to the first $\lceil K_S^C/2 \rceil$ CMR resources of group 1 followed by the first $\lfloor K_S^C/2 \rfloor$ resources of group 2. The second mapping (FIG. 5B) interleaves CMR resources from the two CMR groups.

Note that the numbering of CMR resources in FIGS. 3 and 4 assume a single resource list for the resource set, with CMR resource index i∈ $\{0, 1 \ldots, K_S-1\}$. However different resource lists for each CMR group are also possible with CMR resource index in group 1, $i_1 \in \{0, 1, \ldots, K_1-1\}$ and CMR resource index in group 2, $i_2 \in \{0, 1, \ldots, K_2-1\}$. In the latter case, the same CRI mapping options of FIG. 5A or 5B are applicable, but the CMR index values need to be modified accordingly.

In general, the two CRI extensions can be described by the following mathematical functions. Indicate with $c=N, N+1, \ldots, N+K_S^C-1$, for $K_S^C>0$, the CRI codepoint indices to be assigned to the $K_S^C$ single-TRP measurement hypotheses. Indicate with $i=0, 1, \ldots, K_S-1$, the CMR resource index in the CSI-RS resource set, where the first $K_1=K_S/2$ resources are in CMR group 1 and the last $K_2=K_S/2$ resources are in CMR group 2. Then, the CMR resource index i associated to the CRI codepoint c is obtained by the map $i=\pi(c)$. For CRI map option 1 of FIG. 5A, the function is given by the following:

$$\pi_1(c) = \begin{cases} c-N, & N \leq c \leq N + \lceil K_s^C/2 \rceil - 1 \\ c - \left(N + \left\lceil \frac{K_s^C}{2} \right\rceil \right) + K_1 + 1, & N + \lceil K_s^C/2 \rceil \leq c \leq N + K_s^C - 1 \end{cases}, \tag{2}$$

$$\text{for } K_s^C > 0,$$

whereas for the CRI map option 2, the function is the following, where $\lfloor \cdot \rfloor$ indicates a floor operator:

$$\pi_2(c) = (c - N \bmod 2)\frac{K_s}{2} + \left\lfloor \frac{c-N}{2} \right\rfloor, \tag{3}$$

$$c = N, N+1, \ldots, N + K_s^C - 1 \text{ and } K_s^C > 0,$$

The inverse function provides the CRI codepoint c corresponding to a CMR index i, $c=\pi^{-1}(i)$, and tells a UE what CRI index to report for a single-TRP CSI calculated on CMR resource i. The inverse map for option 1 of FIG. 5A is given by the following:

$$\pi_1^{-1}(i) = \begin{cases} i+N, & 0 \le i \le \lceil K_s^C/2 \rceil - 1 \\ i + \left(N + \left\lceil \frac{K_s^C}{2} \right\rceil\right) - K_1 - 1 & K_1 + 1 \le i \le K_1 + \lfloor K_s^C/2 \rfloor \end{cases}, \quad (4)$$

for $K_s^C > 0$, whereas the inverse map for option 2 is given by the following:

$$\pi_2^{-1}(i) = (2i - K_s \bmod K_s) + \left\lfloor \frac{2i}{K_s} \right\rfloor + N, \text{ for } i = 0, 1, \ldots, K_s - 1.$$

One advantage of option 2 (FIG. 5B) over option 1 (FIG. 5A) is that the function $\pi_2^{-1}(i)$ does not depend on the number of configured single-TRP measurements $K_s^C$, as for $\pi_1^{-1}(i)$. Therefore, with option 2 mapping, the CRI codepoints associated to the CMR resources in group 2 do not change for different values of $K_s^C$.

Regarding the CPU occupancy definition, the number of occupied CPUs is (see reference 440 of FIG. 4) $2N+K_s^C$, considering that an NCJT measurement occupies 2 CPUs whilst each single-TRP measurement occupies 1 CPU.

Finally, the parameter $K_s^R$ indicating the number of reported single-TRP CSIs is used in conjunction with $K_s^C$ to determine what type of multi-TRP CSI report is configured. The value set for $K_s^C$ is {0,1,2} and the four possible configurations are given by the following (see also reference 450 of FIG. 4):

$K_s^R=0=K_s^C$: best NCJT;
$K_s^R=0<K_s^C$: best {NCJT, group 1, group 2};
$K_s^R=1$: best NCJT+best {group1, group 2}; and
$K_s^R=2$: best NCJT+best group 1+best group 2.

Figure 6A:
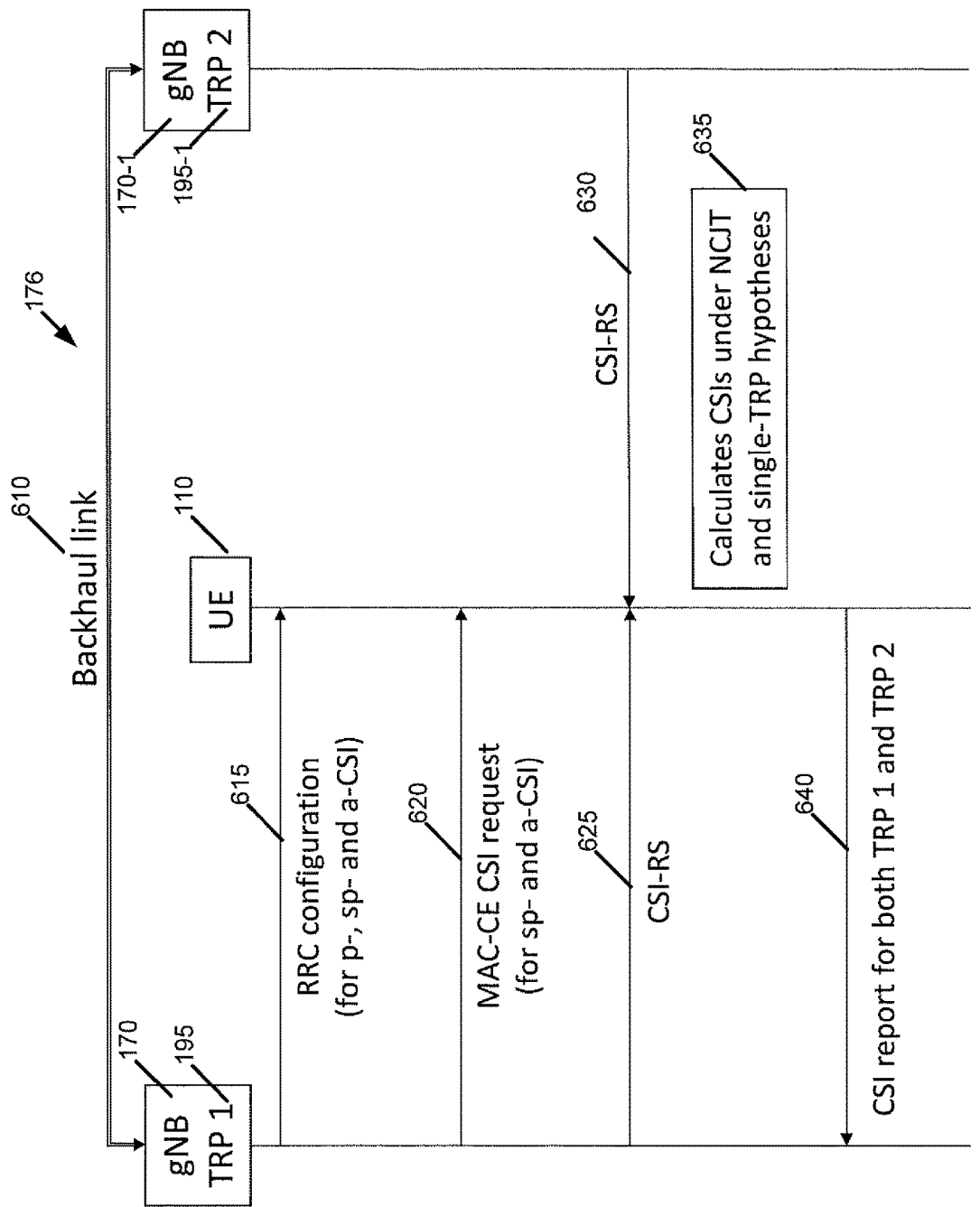
FIGS. 6A and 6B are signaling diagrams/flowcharts for the single-DCI and multi-DCI case corresponding to FIGS. 2A and 2B, respectively, in accordance with exemplary embodiments.
Figure 6B:
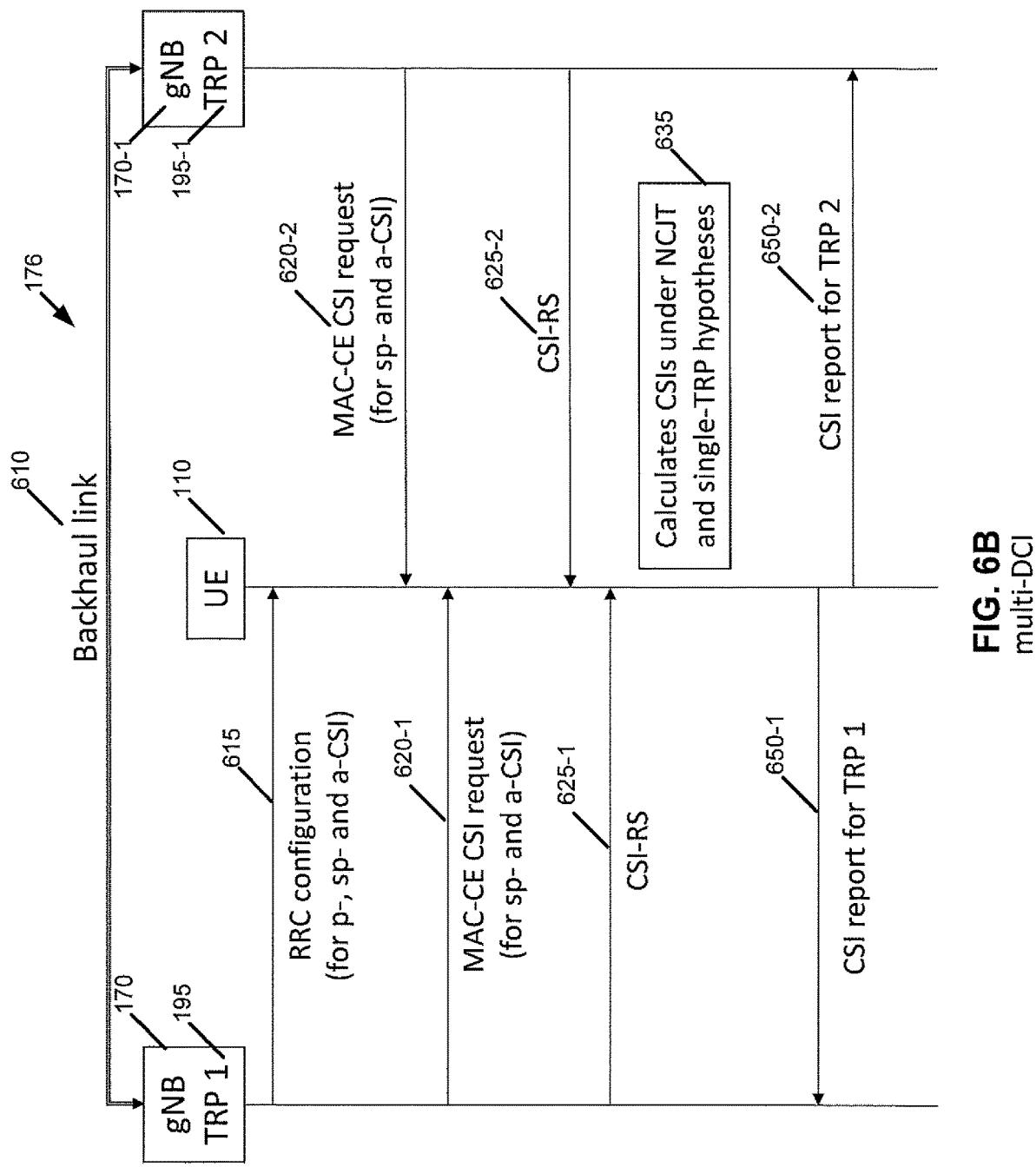

FIGS. 6A and 6B are signaling diagrams/flowcharts for the single-DCI and multi-DCI case corresponding to FIGS. 2A and 2B, respectively, in accordance with exemplary embodiments. These figures illustrate the operation of exemplary methods, a result of execution of computer program instructions embodied on a computer readable memory, functions performed by logic implemented in hardware, and/or interconnected means for performing functions in accordance with exemplary embodiments. In both figures, the two gNBs 170 and 170-1 communicate using backhaul link 610, which is a version of link 176. The gNB 170 controls a TRP 1 195, and the gNB 170-1 controls a TRP2 195-1. The following definitions are used: p-CSI is periodic CSI; sp-CSI is semi-persistent CSI; and a-CSI is aperiodic CSI.

As a point of clarification, a UE is configured with (e.g., at least) two groups (e.g., group 1 and group 2) of reference signals (RSs) rather than RS from two TRPs. The UE 110 is therefore not aware of the association between a RS and the TRP transmitting the RS. For example, there may be three or more TRPs/base stations in a cluster and group 1 contains one RS from TRP 1 and one from TRP 2, and group 2 contains one RS from TRP 3. The UE does not know this, and instead only knows which RS belongs to individual ones of groups 1 or 2.

As a further point of clarification on terminology used at least in FIGS. 6A and 6B, one CSI report may contain multiple CSIs (corresponding to different measurement hypotheses) and each CSI may contain multiple quantities (for example PMI, CQI, RI, and the like). Each CSI quantity, for example PMI, may contain multiple indicators, i.e., numerical indices mapped to certain values. The term "information" is meant to encompass all of these indicators.

For the single-DCI case in FIG. 6A, the gNB 170 sends an RRC configuration in signaling 615, for p-, sp- and a-CSI (i.e., p-CSI, sp-CSI and a-CSI), to the UE 110. The gNB 170 in signaling 620 sends a MAC-CE CSI request, for sp- and a-CSI, to the UE 110. Both the gNBs 170 and 170-1 send the CSI-RS in signaling 625 and 630 toward the UE 110. In response, the UE 110 (see block 635) calculates CSIs under the NCJT and single-TRP hypotheses. In signaling 640, the UE 110 sends a CSI report toward the gNB 170 for both the TRP 1 195 and TRP2 195-1. Note that the gNB 170 sends the CSI report for the TRP2 195-1 to the gNB 170-1 over the backhaul link 610.

For the multi-DCI case in FIG. 6B, the gNB 170 sends an RRC configuration in signaling 615, for p-, sp- and a-CSI (i.e., p-CSI, sp-CSI and a-CSI), to the UE 110. The gNB 170 in signaling 620-1 and the gNB 170-1 in signaling 620-2 sends a MAC-CE CSI request, for sp- and a-CSI, to the UE 110. Both the gNBs 170 and 170-1 send the CSI-RS in signaling 625-1 and 625-2 toward the UE 110. In response, the UE 110 (see block 635) calculates CSIs under the NCJT and single-TRP hypotheses. In signaling 650-1, the UE 110 sends a CSI report toward the gNB 170 for the TRP 1 195. In signaling 650-2, the UE 110 sends a CSI report toward the gNB 170-1 for the TRP 2 195-1.

While the emphasis is placed herein on the UE 110, the gNB 170 (and 170-1) also use this information. One action for a gNB, for instance, is to interpret the received CSI indicators, including the reconstructions of the PMIs (precoder matrix indicators) from the CSI message. Then a gNB may use the CSI quantities to make scheduling decisions, such us which UEs to serve, what time, frequency and spatial resources to allocate to each scheduled user and which TRPs to transmit from, and the like. The gNB will then use the CSI for link adaptation and to precode the data on PDSCH and the DMRSs (Demodulation Reference Signals).

These operations can be summarized as the following:
1) Decoding of the CSI quantities reported in the UCI (Uplink Control Information);
2) Use of the CSI quantities for scheduling DL transmission (scheduling of UEs and resources) and future CSI requests; and
3) Use of the CSI quantities for link adaptation (MCS, Modulation and Coding Scheme, selection) and precoding of PDSCH and DMRSs.

Without in any way limiting the scope, interpretation, or application of the claims appearing below, a technical effect and advantage of one or more of the example embodiments disclosed herein is to provide a flexible mechanism for the network to control four aspects of multi-TRP CSI reporting configuration with two simple parameters: the four aspects are the number of single-TRP measurements, the number of occupied CPUs, the type of M-TRP report, including the number of reported CSIs, and the CRI extension used by the UE to indicate the resources corresponding to the reported CSIs. The two control parameters are the number of configured single-TRP measurements and the number of reported single-TRP measurements. Another technical effect and advantage are that these two configuration parameters are compact enough (e.g., four and two bits, respectively), to be included in a MAC-CE command, which makes it possible for the network to adapt these four aspects of the CSI Reporting Setting dynamically, depending on prior channel knowledge, CPU occupancy, available resources for reporting in PUCCH/PUSCH, and the like.

As used in this application, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

3GPP third generation partnership project
5G fifth generation
5GC 5G core network
a-CSI aperiodic CSI
AMF access and mobility management function
CMR channel measurement resource
CPU CSI processing unit
CQI channel quality information
CRI CSI-RS resource indicator
CSI channel state information
CU central unit
DCI downlink control information
DL downlink (from network toward UE)
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FFS for future study
gNB (or gNodeB) base station for 5G/NR, i.e., a node providing NR user plane and control plane protocol terminations towards the UE, and connected via the NG interface to the 5GC
I/F interface
LTE long term evolution
MAC medium access control
MAC-CE MAC-control element
MME mobility management entity
NCJT noncoherent joint transmission
ng or NG next generation
ng-eNB or NG-eNB next generation eNB
NR new radio
N/W or NW network
p-CSI periodic CSI
PDCP packet data convergence protocol
PDSCH physical downlink shared channel
PHY physical layer
PUCCH physical uplink control channel.
PUSCH physical uplink shared channel
RAN radio access network
Rel release
RLC radio link control
RRH remote radio head
RRC radio resource control
RS reference signal
RU radio unit
Rx receiver
SDAP service data adaptation protocol
SGW serving gateway
sp-CSI semi-periodic CSI
SMF session management function
TRP transmission-reception point
TS technical specification
Tx transmitter
UE user equipment (e.g., a wireless, typically mobile device)
UL uplink (from UE toward network)
UPF user plane function

What is claimed is:
1. A method, comprising:
measuring, by a user equipment, reference signals from at least two different groups of reference signals trans- mitted from at least two different transmission-reception points from corresponding different base stations;

calculating, by the user equipment, channel state information for the at least two different transmission-reception points based on reference signals configured in the at least two different groups;

sending, by the user equipment, one or more reports corresponding to the calculated channel state information, the one or more reports comprising information for the at least two different transmission-reception points of a number of reported hypotheses for a single-transmission-reception point measurement and a corresponding association to a number of configured hypotheses for the single-transmission-reception point measurement, wherein the number of configured hypotheses for the single-transmission-reception point measurement is $K_S^C$, and wherein a value set for KS is $\{0,1, \ldots, K_S\}$, wherein $K_S$ is a number of channel measurement resources in a resource set for reference signals transmitted by the at least two different transmission-reception points and divided into the at least two different groups of reference signals, and wherein the reference signals are channel state information reference signals and a resource indicator bit width for the channel state information reference signals is $[\log_2(N+K_S^C)]$, wherein N indicates a number of configured noncoherent joint transmission hypotheses.

2. An apparatus A user equipment, comprising:
one or more processors; and
one or more memories storing instructions that, when executed by the one or more processors, cause the user equipment at least to perform:

measuring, reference signals from at least two different groups of reference signals transmitted from at least two different transmission-reception points from corresponding different base stations;

calculating, channel state information for the at least two different transmission-reception points based on reference signals configured in the at least two different groups;

sending, one or more reports corresponding to the calculated channel state information, the one or more reports comprising information for the at least two different transmission-reception points of a number of reported hypotheses for a single-transmission-reception point measurement and a corresponding association to a number of configured hypotheses for the single-transmission-reception point measurement, wherein the number of configured hypotheses for the single-transmission-reception point measurement is $K_S^C$, and wherein a value set for $K_S^C$ is $\{0.1, \ldots, K_S\}$, wherein $K_S$ is a number of channel measurement resources in a resource set for reference signals transmitted by the at least two different transmission-reception points and divided into the at least two different groups of reference signals, and wherein the reference signals are channel state information reference signals and a resource indicator bit width for the channel state information reference signals is $[\log_2(N+K_S^C)]$, wherein N indicates a number of configured noncoherent joint transmission hypotheses.

3. The user equipment of claim 2, wherein the sending comprises:
sending a single report of the one or more reports, comprising channel state information and corresponding measurement hypothesis information for both of two transmission-reception points of the at least two different transmission-reception points, on a single configured uplink data or control channel resource.

4. The user equipment of claim 3, wherein channel state information processing unit occupancy, $O_{CPU}$, as part of the channel state information, is indicated by $O_{CPU}=2N+KS$, wherein N indicates a number of configured noncoherent joint transmission hypotheses.

5. The apparatus user equipment of claim 3, wherein:
the user equipment is configured to measure certain pairs of resources under a noncoherent joint transmission hypothesis and individual resources under a single-transmission-reception point transmission hypothesis;
the number of reported hypotheses for the single-transmission-reception point measurement is KR, and a value set for KR is $\{0,1,2\}$.

6. The user equipment of claim 5, wherein a first one of the at least two different groups is group 1 and a second one of the at least two different groups is group 2, and wherein the number of reported hypotheses for the single-transmission-reception point measurement, $K_S^R$, and the number of configured hypotheses for the single-transmission-reception point measurement, $K_S^C$, indicate one of the following multiple configurations:

$K_S^R=0$, $K_S^C=0$: a best noncoherent joint transmission hypothesis;

$K_S^R=0$, $K_S^C>0$: a best of a set {noncoherent joint transmission hypothesis, group 1, group 2};

$K_S^R=1$: a best noncoherent joint transmission hypothesis and a best of a set {group 1, group 2}; or $K_S^R=2$: a best noncoherent joint transmission hypothesis and a best of group 1 and a best of group 2.

7. The user equipment of claim 5, wherein:
there is a mapping from codepoints to resources under both the noncoherent joint transmission hypothesis and the individual resources under the single-transmission-reception point transmission hypothesis;
the mapping is split into two parts;
a first contiguous one of the two parts of the mapping is reserved for the resources under the noncoherent joint transmission hypothesis; and
a second contiguous one of the two parts of the mapping is reserved for first and second groups of the at least two different groups of resources under the single-transmission-reception point transmission hypothesis, and codepoints in the second contiguous one of the two parts alternate between a measurement hypothesis for the first group and a measurement hypothesis for the second group.

8. The user equipment of claim 2, wherein the one or more reports are formed into a first report and a second report, and the sending comprises:
sending the first report, comprising channel state information and corresponding measurement hypothesis information only for a first of the at least two different transmission-reception points, on a first uplink data or control resource associated with a first one of the at least two different groups of reference signals; and
sending the second report, comprising channel state information and the corresponding measurement hypothesis information only for a second of the at least two different transmission-reception points, on a second uplink data or control resource associated with a second one of the at least two different groups of reference signals.

9. A first base station, comprising:
one or more processors; and
one or more memories storing instructions that, when executed by the one or more processors, cause the first base station at least to perform:
sending reference signals from a first transmission-reception point of the first base station toward a user equipment, where the user equipment is also in communication at least with a second transmission-reception point of a second base station, wherein reference signals from at least two different groups of reference signals are transmitted from at least the first and second transmission-reception points; and
receiving, from the user equipment, one or more reports corresponding to channel state information calculated by the user equipment for reference signals configured in the at least two different groups, the one or more reports comprising information for at least the first and second transmission-reception points of a number of reported hypotheses for a single-transmission-reception point measurement and a corresponding association to a number of configured hypotheses for the single-transmission-reception point measurement, wherein the number of configured hypotheses for the single-transmission-reception point measurement is $K_S^C$, and wherein a value set for $K_S^C$ is $\{0.1, \ldots, K_S^C\}$, wherein $K_S^C$ is a number of channel measurement resources in a resource set for reference signals transmitted by at least the first and second transmission-reception points and divided into the at least two different groups of reference signals, and wherein the reference signals are channel state information reference signals and a resource indicator bit width for the channel state information reference signals is $\log_2(N+K_S^C)]$, wherein N indicates a number of configured noncoherent joint transmission hypotheses.

10. The first base station of claim 9, wherein:
the receiving comprises receiving a single report, comprising channel state information and corresponding measurement hypothesis information for both of two transmission-reception points of the at least two different transmission-reception points, on a single configured uplink data or control channel resource; and
the one or more memories further store instructions that, when executed by the one or more processors, cause the apparatus base station at least to perform: sending, by the first base station, the channel state information and corresponding measurement hypothesis information for the second transmission-reception point toward the second transmission-reception point.

11. The first base station of claim 10, wherein channel state information processing unit occupancy, $O_{CPU}$, as part of the channel state information, is indicated by $O_{CPU}=2N+KS$, wherein N indicates a number of configured noncoherent joint transmission hypotheses.

12. The first base station of claim 10, wherein:
the user equipment is configured to measure certain pairs of resources under a noncoherent joint transmission hypothesis and individual resources under a single-transmission-reception point transmission hypothesis;
the number of reported hypotheses for the single-transmission-reception point measurement is $K_S^R$, and a value set for $K_S^R$ is $\{0,1,2\}$.

13. The first base station of claim 12, wherein a first one of the at least two different groups is group 1 and a second one of the at least two different groups is group 2, and wherein the number of reported hypotheses for the single-transmission-reception point measurement, $K_S^R$, and the number of configured hypotheses for the single-transmission-reception point measurement, $K_S^C$, indicate one of the following multiple configurations:
$K_S^R=0$, $K_S^C=0$: a best noncoherent joint transmission hypothesis;
$K_S^R=0$, $K_S^C>0$: a best of a set {noncoherent joint transmission hypothesis, group 1, group 2};
$K_S^R=1$: a best noncoherent joint transmission hypothesis and a best of a set {group 1, group 2}; or
$K_S^R=2$: a best noncoherent joint transmission hypothesis and a best of group 1 and a best of group 2.

14. The first base station of claim 12 wherein:
there is a mapping from codepoints to resources under both the noncoherent joint transmission hypothesis and the individual resources under the single-transmission-reception point transmission hypothesis;
the mapping is split into three parts;
a first contiguous one of the three parts of the mapping is reserved for the resources under the noncoherent joint transmission hypothesis;
a second contiguous one of the three parts of the mapping is reserved for a first one of the at least two different groups of resources under the single-transmission-reception point transmission hypothesis; and
a third contiguous one of the three parts of the mapping is reserved for a second one of the at least two different groups of resources under the single-transmission-reception point transmission hypothesis.

15. The first base station of claim 12, wherein:
there is a mapping from codepoints to resources under both the noncoherent joint transmission hypothesis and the individual resources under the single-transmission-reception point transmission hypothesis;
the mapping is split into two parts;
a first contiguous one of the two parts of the mapping is reserved for the resources under the noncoherent joint transmission hypothesis; and
a second contiguous one of the two parts of the mapping is reserved for first and second groups of the at least two different groups of resources under the single-transmission-reception point transmission hypothesis, and codepoints in the second contiguous one of the two parts alternate between a measurement hypothesis for the first group and a measurement hypothesis for the second group.

* * * * *